United States Patent
Pedercini et al.

(10) Patent No.: US 8,881,786 B2
(45) Date of Patent: Nov. 11, 2014

(54) DEVICE FOR FORMING AND TRANSFERRING A SLEEVE-LIKE LABEL TO A CONTAINER TO BE LABELED

(75) Inventors: Maurizio Pedercini, Marmirolo (IT); Daniele Marastoni, San Giovanni in Persiceto (IT); Paolo Lanfredi, Castellucchio (IT)

(73) Assignee: Sacmi Verona S.p.A., Imola (IT)

( * ) Notice: Subject to any disclaimer, the term of this patent is extended or adjusted under 35 U.S.C. 154(b) by 0 days.

(21) Appl. No.: 13/261,638

(22) PCT Filed: Oct. 19, 2011

(86) PCT No.: PCT/IB2011/054659
§ 371 (c)(1),
(2), (4) Date: Apr. 15, 2013

(87) PCT Pub. No.: WO2012/052938
PCT Pub. Date: Apr. 26, 2012

(65) Prior Publication Data
US 2013/0213579 A1 Aug. 22, 2013

(30) Foreign Application Priority Data

Oct. 21, 2010 (IT) .............................. VR2010A0199

(51) Int. Cl.
*B32B 37/00* (2006.01)
*B65C 3/06* (2006.01)
*B29C 65/00* (2006.01)
*B29C 65/16* (2006.01)
*B29C 65/08* (2006.01)
*B29C 65/18* (2006.01)
*B29C 65/14* (2006.01)

(52) U.S. Cl.
CPC ............ *B65C 3/065* (2013.01); *B29C 66/1122* (2013.01); *B29C 65/16* (2013.01); *B29C 65/08* (2013.01); *B29C 65/18* (2013.01); *B29C 66/4322* (2013.01); *B29C 65/1412* (2013.01)
USPC ........................... 156/552; 156/538; 156/566

(58) Field of Classification Search
USPC ............... 156/84, 85, 86, 538, 539, 540, 541, 156/542, 552, 556, 566
See application file for complete search history.

(56) References Cited

U.S. PATENT DOCUMENTS

| | | | |
|---|---|---|---|
| 4,014,734 A | 3/1977 | Patterson | |
| 4,806,187 A | 2/1989 | Fujisawa | |
| 5,531,858 A | 7/1996 | Hong | |
| 6,016,641 A * | 1/2000 | Nagano | ........................... 53/298 |
| 6,263,940 B1 * | 7/2001 | Menayan | ...................... 156/556 |
| 7,398,811 B1 | 7/2008 | Duncan | |
| 2007/0056679 A1 | 3/2007 | Orlandi | |

* cited by examiner

*Primary Examiner* — James Sells
(74) *Attorney, Agent, or Firm* — Modiano & Associati; Albert Josif; Daniel J. O'Byrne

(57) ABSTRACT

A device for forming and transferring a sleeve-like label to a container to be labeled, comprising a feeder designed to feed a portion of heat-shrink film to at least one forming spindle and means for wrapping the portion of heat-shrink film around the lateral surface of the forming spindle, feeder means being provided which are adapted to move, along an approach path that has at least one component perpendicular to the axis of the forming spindle, the container to be labeled to a labeling position arranged below the forming spindle and pick-up means adapted to pick up the container with the sleeve-like label fitted around the respective lateral surface along a path for removal from the labeling position which has at least one component perpendicular to the axis of the forming spindle.

8 Claims, 7 Drawing Sheets

DEVICE FOR FORMING AND TRANSFERRING A SLEEVE-LIKE LABEL TO A CONTAINER TO BE LABELED

The present invention relates to a device for forming and transferring sleeve-like labels to a container to be labeled.

BACKGROUND OF THE INVENTION

Typically, sleeve-like labels or shrink-sleeve labels are made of polymeric material such as polyethylene terephthalate (PET), polyvinyl chloride (PVC), polypropylene (PP), polystyrene (PS) or other materials adapted to be heat-shrunk.

The term "sleeve-like label" or "shrink-sleeve label" designates tubular labels made of plastic film that are designed to be fitted around a respective container to be labeled and subsequently heated, so that the labels shrink onto the external surface of the container and take the shape of the external surface of such container.

Sleeve-like labels are usually obtained starting from a film made of heat-shrink plastic material that is unwound from a spool in order to be fed, by means of a movement device, to a transfer drum.

A cutting device thus performs the cutting of the plastic film transversely to the approach direction, so as to obtain portions of plastic film that have a preset length according to the dimensions of the container to be labeled.

By means of the transfer drum, the portions of film are transferred generally to a carousel, which is provided with devices for forming and transferring the sleeve-like labels to a container to be labeled.

These forming and transferring devices are constituted by respective forming spindles, suitably arranged on the periphery of such carousel and shaped to receive from the transfer drum portions of plastic film so as to obtain respective tubular sleeve-like elements.

A locking head protrudes downward from the lower end of the forming spindle and is designed, during the step of transferring the sleeve-like label from the forming spindle to the container to be labeled, to engage the top portion, generally constituted by the closure, of the container to be labeled in order to keep the latter stably anchored to the pan and in order to allow any angular movement of the container to be labeled about a vertical axis.

The locking head can move on command, along a vertical direction, to alternate between a raised disengagement condition, which is adapted to allow, during the step for feeding the containers to be labeled to the carousel, the arrangement of the container to be labeled in a position below the respective forming spindle and, during the step for unloading the containers from the carousel, the transfer of the container from the pan to the unloading belt, and a lowered engagement condition, in which the locking head presses against the top portion of the container to be labeled.

More precisely, each spindle comprises an external cylindrical wall that has a specific diameter, substantially equal to the preset diameter of the label to be provided, and on which each portion of plastic film is wrapped so that a first longitudinal edge of the portion of plastic film is partially superimposed on the opposite edge of the same portion in an overlap region, so as to form the tubular sleeve-like element.

In the overlap region, the junction is usually provided by using suitable welding techniques so as to obtain a sleeve-like label.

Advantageously, each spindle can be provided with sealing means arranged so as to make the corresponding portion of plastic film adhere to the cylindrical wall and wrap around it.

By way of example, these sealing means may be constituted by a plurality of holes, provided in the cylindrical wall, through which air is drawn from the outside toward the inside of the spindle.

Each spindle, moreover, can be provided with means for expelling air which are designated to facilitate the separation of the sleeve-like label from the spindle itself, so as to expand the spindle radially once the joining operations have been completed.

Each spindle, as mentioned, is generally associated with a support, typically a pan, which is adapted to receive in resting contact a container to be labeled.

Specifically, the sleeve-like label can be fitted onto the container to be labeled by means of a relative axial movement between the label and the container along the longitudinal axis of the latter, so that the sleeve-like label is fitted onto the container.

This operation is normally performed by keeping the container stationary and pushing, for example by means of a pusher, the sleeve-like label from above in order to fit it around the container to be labeled.

The container and the shrink-sleeve label fitted thereon are then guided toward a heating station, in which the label is subjected to a thermal treatment such as to cause its shrinking by thermal effect and, thus, its tight adhesion to the lateral surface of the respective container.

One drawback of the devices for forming and transferring sleeve-like labels currently used consists in the fact that during the step for transferring the label from the forming spindle to the container to be labeled, the label is not "guided" sufficiently by the forming spindle.

In particular, this drawback appears mostly in the case of labels with a considerable vertical extension when the container to be labeled is particularly shaped and therefore is unable, with its lateral surface, to guide the label during descent, and in the case of labels of reduced height, because in this case guiding is ensured almost exclusively by the forming spindle.

This causes, mainly in the case of labeling containers that have significant variations in transverse cross-section along their vertical extension, a risk of label jamming due to possible inclination with respect to the vertical of the label to be transferred.

This causes a certain number of rejects due to an incorrect fitting of the sleeve-like label around the container to be labeled.

SUMMARY OF THE INVENTION

The aim of the present invention is to eliminate, or at least reduce drastically, the drawbacks mentioned above in currently known devices for forming and transferring sleeve-like labels to a container to be labeled.

Within this aim, an object of the invention is to provide a device for forming and transferring sleeve-like labels to a container to be labeled that is capable of transferring correctly the sleeve-like label to the respective container to be labeled regardless of the shape of the container and of the length of the label.

This aim and these and other objects that will become more apparent hereinafter are achieved by a device for forming and transferring sleeve-like labels to a container to be labeled, according to claim 1.

BRIEF DESCRIPTION OF THE DRAWINGS

Further characteristics and advantages of the invention will become more apparent from the description of preferred but not exclusive embodiments of a device for forming and transferring sleeve-like labels to a container to be labeled according to the invention, illustrated by way of non-limiting example in the accompanying drawings, wherein.

DESCRIPTION OF THE PREFERRED EMBODIMENTS

Figure 1:
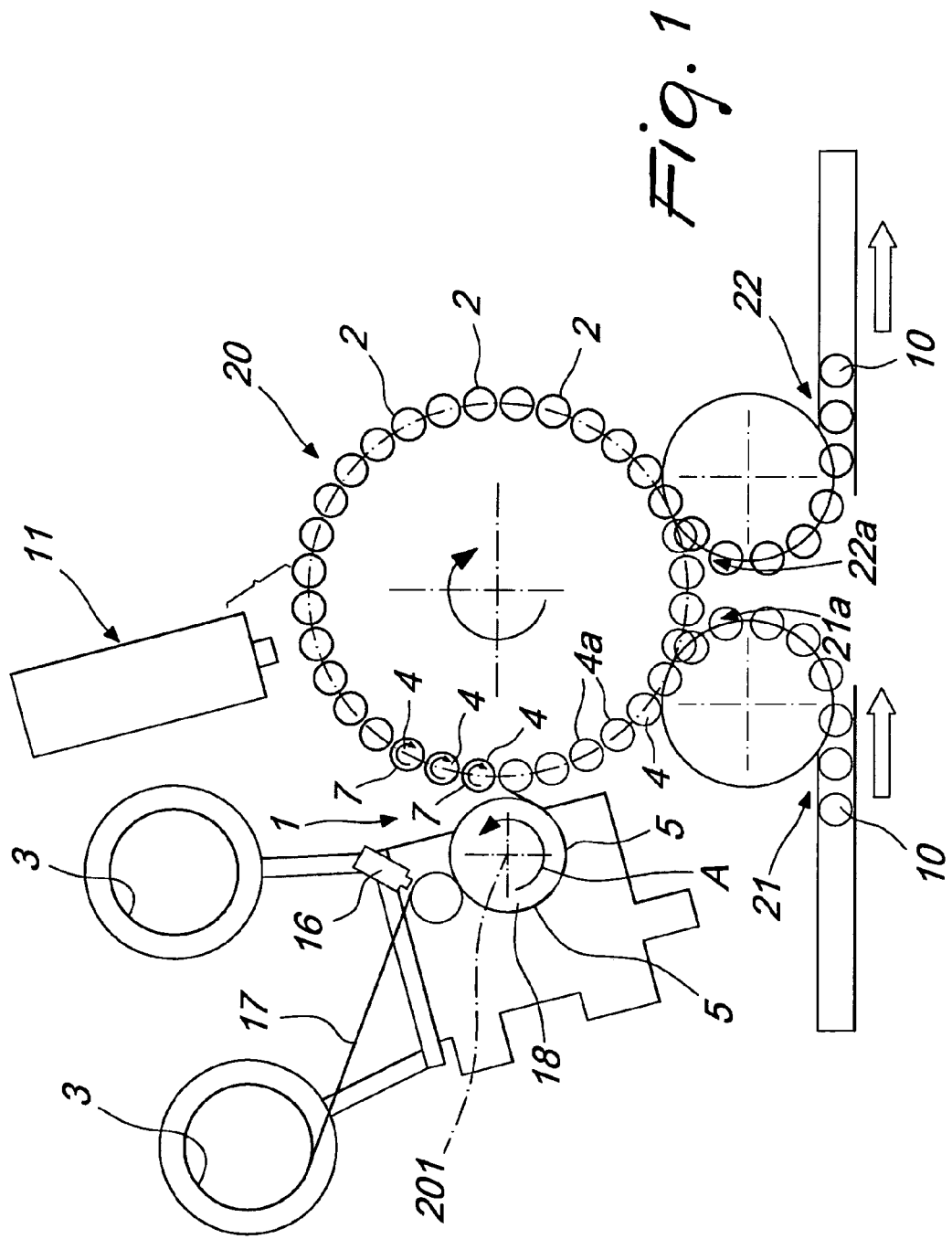
FIG. 1 is a schematic top view of a labeling unit associated with a device for forming and transferring sleeve-like labels according to the present invention.
Figure 2:
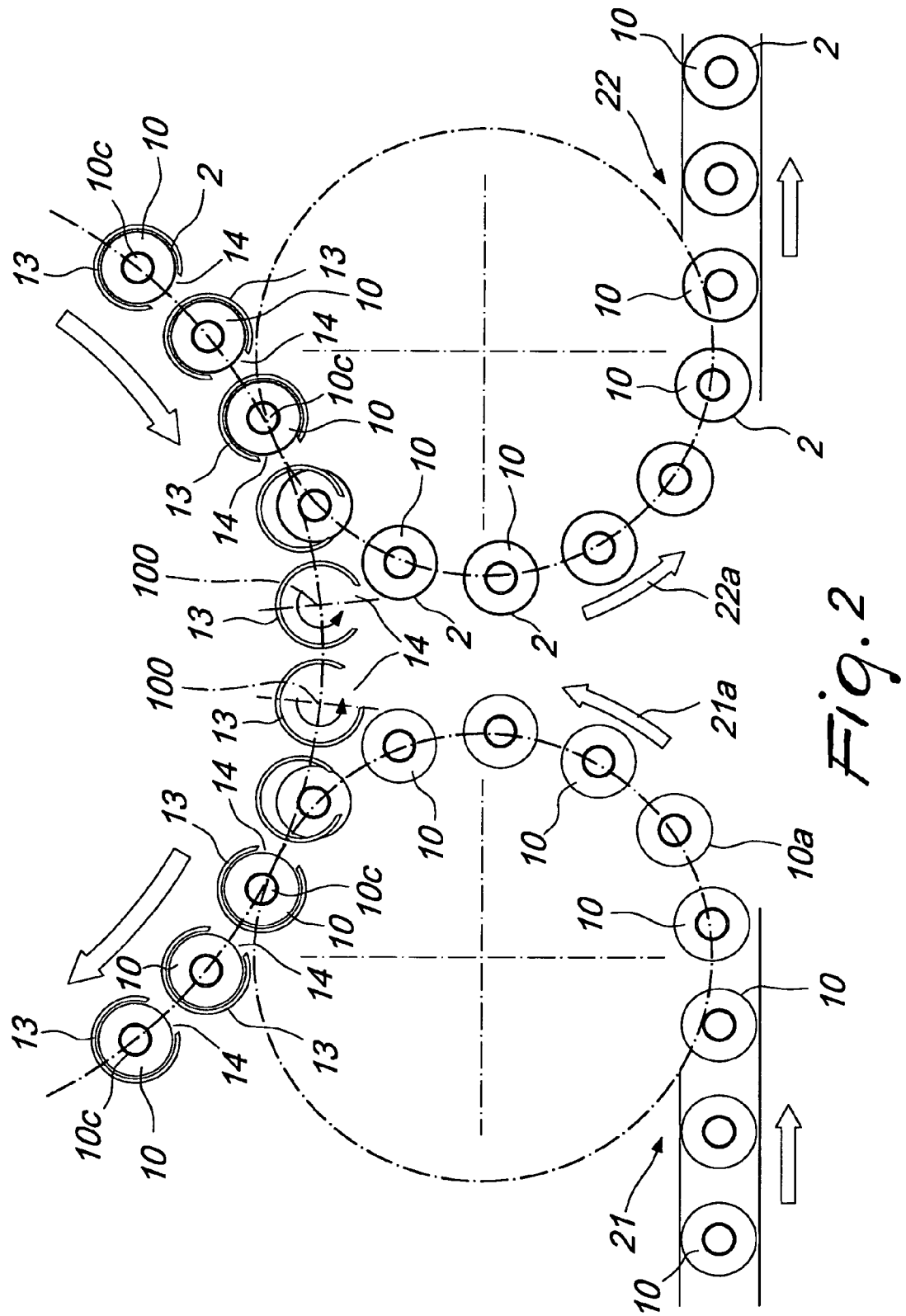
FIG. 2 is a schematic view of the stations for feeding and unloading the containers to be labeled to and from the carousel, taken along a sectional plane that lies transversely to the axis of rotation of the carousel and passes through the lower guiding body at the level of the lateral access opening.

With reference to the figures, a device, generally designated by the reference numeral 1, for the production of a sleeve-like label 2 comprises at least one feeder designed to feed at least one portion of heat-shrink film 5 to at least one forming spindle 4.

By way of example, the feeder can be constituted by at least one feeder spool 3 of a known type designed to feed a portion of heat-shrink film 5 to at least one forming spindle 4.

The device 1 has, moreover, means 7 for wrapping the portion or each portion of heat-shrink film 5 around the lateral surface 4a of at least one corresponding forming spindle 4.

Moreover, there are means 9 for transferring the sleeve-like label 2 formed on the forming spindle 4 from the forming spindle 4 itself to a container to be labeled 10.

The device 1 has feeder means 21, which are adapted to carry, along an approach path 21a that has at least one component at right angles to the axis 100 of the forming spindle 4, the container to be labeled 10 to a labeling position arranged below the forming spindle 4.

Likewise, there are pick-up means 22, which in turn are adapted to pick up the container 10 with the sleeve-like label 2 fitted around the respective lateral surface 10a in order to unload it, along a spacing path 22a, from the labeling position; said spacing path 22a also has at least one component which is perpendicular to the axis 100 of the forming spindle 4.

According to the present invention, the or each forming spindle 4 comprises at least one terminal guiding body 13, which is arranged at the lower end 4b of the respective forming spindle 4.

The terminal guiding body 13 has a lower edge 13a which is arranged at least partially at a lower level than the upper end, designated by the reference numeral 10c, of the top portion 10b of the container to be labeled 10 in the labeling position.

The terminal guiding body 13 has at least one lateral access opening 14 that can be crossed by the top portion 10b of the respective container to be labeled 10 that is arriving at the labeling position along the approach path 21a and leaves the labeling position along the spacing path 22a.

Conveniently, except for the lateral access opening 14, the lower edge 13a of substantially the whole terminal guiding body 13 is arranged at a lower level than the upper end 10c of the top portion 10b of the container to be labeled 10 in the labeling position.

Advantageously, the device 1 comprises means for the angular movement of the forming spindle 4 about its own axis 100; these movement means are, specifically, adapted to position the lateral access opening 14 along the approach path 21a so as to allow the feeding of the container to be labeled 10 in the labeling position and in order to arrange the lateral access opening 14 along the spacing path 22a so as to allow the unloading of the container to be labeled 10 with the sleeve-like label 2 fitted around the respective lateral surface 10a from the labeling position.

Advantageously, the angular movement means comprise a device for the angular movement of the forming spindle 4 with respect to the corresponding axis of rotation 100. In this regard the angular movement means can be constituted by the means for rotary actuation of the forming spindle or of each forming spindle 4 about the respective rotation axis 100.

Advantageously, the terminal guiding body 13 has a single lateral access opening 14, which due to the action of the angular movement means is moved so as to intersect the approach path 21a in order to allow the feeding of the container to be labeled 10 in the labeling position and so as to intersect the spacing path 22a to allow the unloading of the container 10 with the sleeve-like label 2 fitted around the respective lateral surface 10a from the labeling position.

By providing a single lateral access opening 14, the guiding surface formed by the terminal guiding body 13 is increased significantly, optimizing the transfer of the sleeve-like label 2.

According to a first embodiment, the terminal guiding body 13 is provided monolithically with said forming spindle 4.

As an alternative, the terminal guiding body 13 can be associated detachably with the corresponding forming spindle 4.

Figure 3:
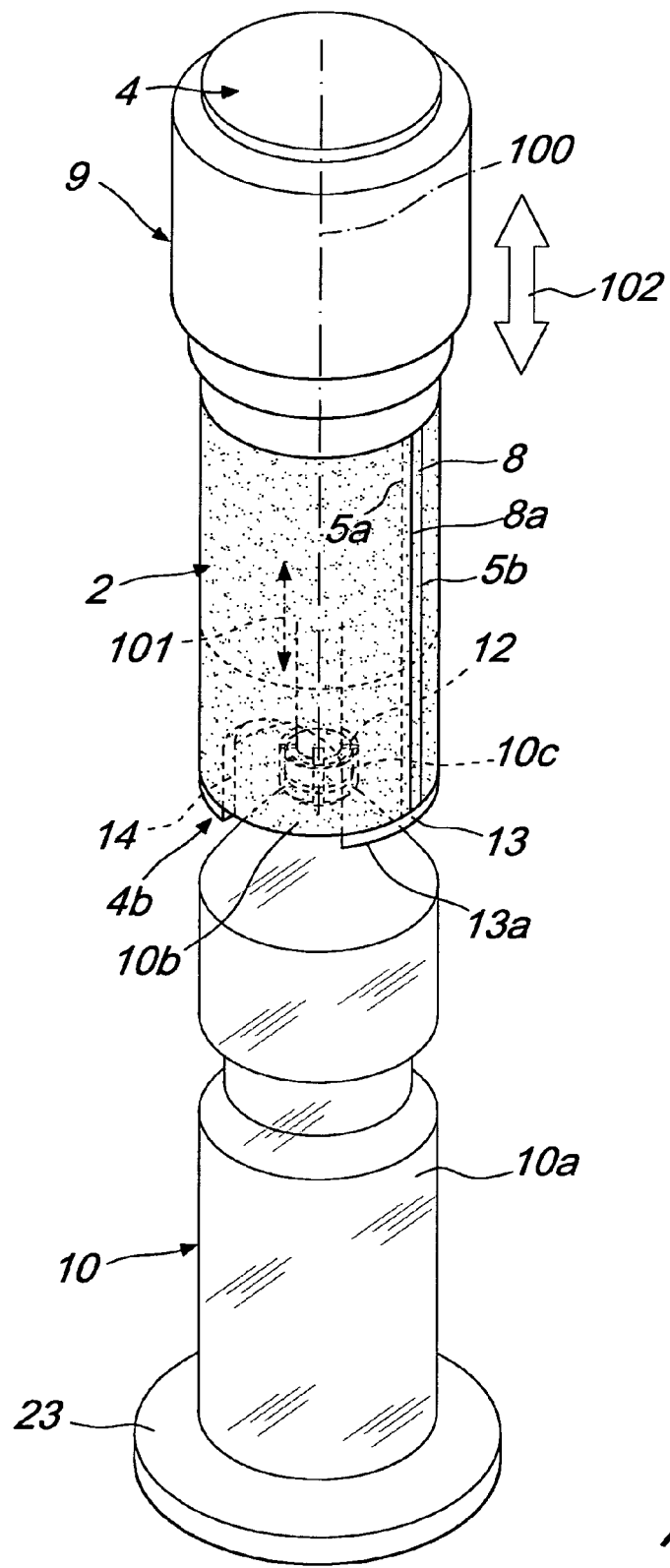
FIG. 3 is a perspective view of a forming spindle with the sleeve-like label wound around the corresponding lateral surface.
Figure 4:
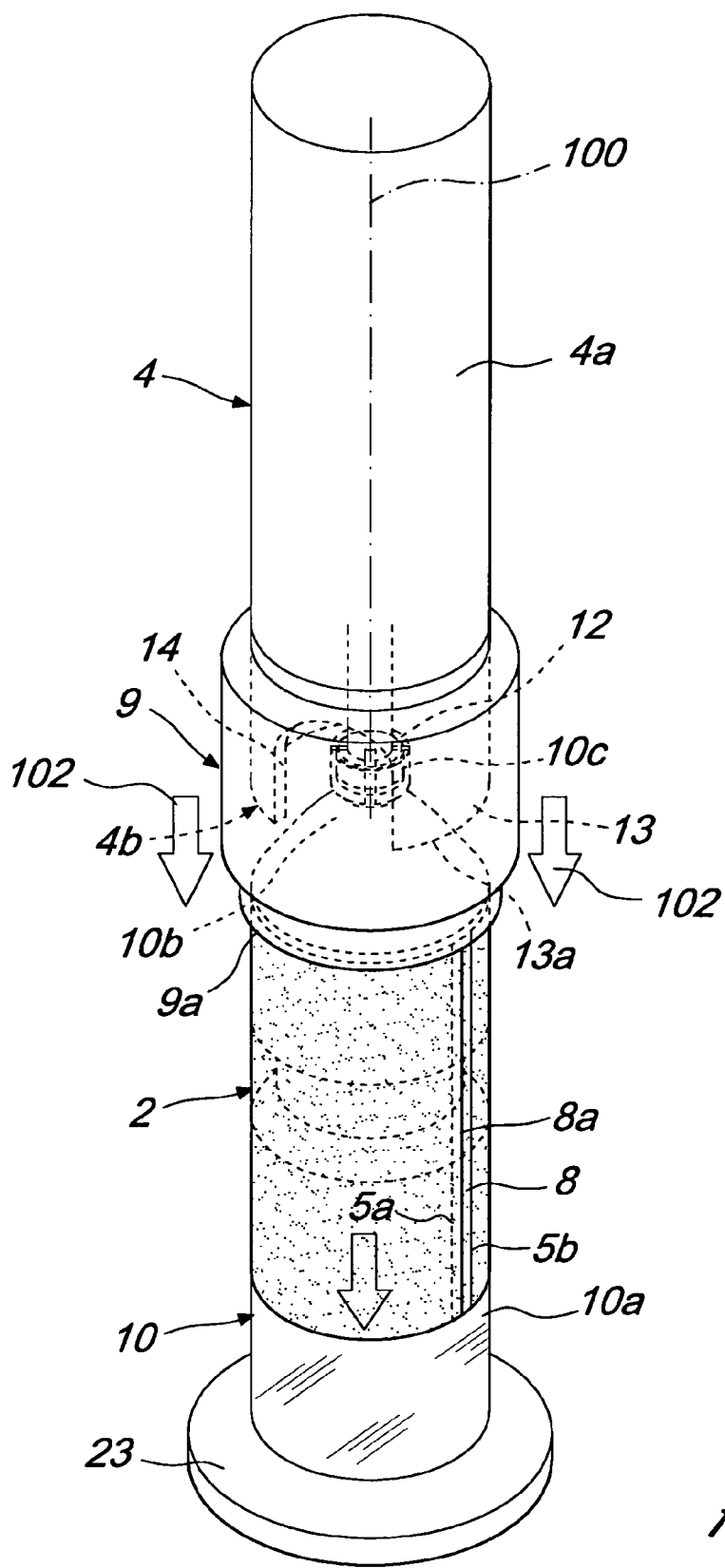
FIG. 4 is a view, similar to the previous one, with the sleeve-like label fitted around the container to be labeled.

With reference to the embodiment shown in FIGS. 3 and 4, the terminal guiding body 13 comprises a side wall whose transverse dimension corresponds to that of the forming spindle 4.

Figure 5:
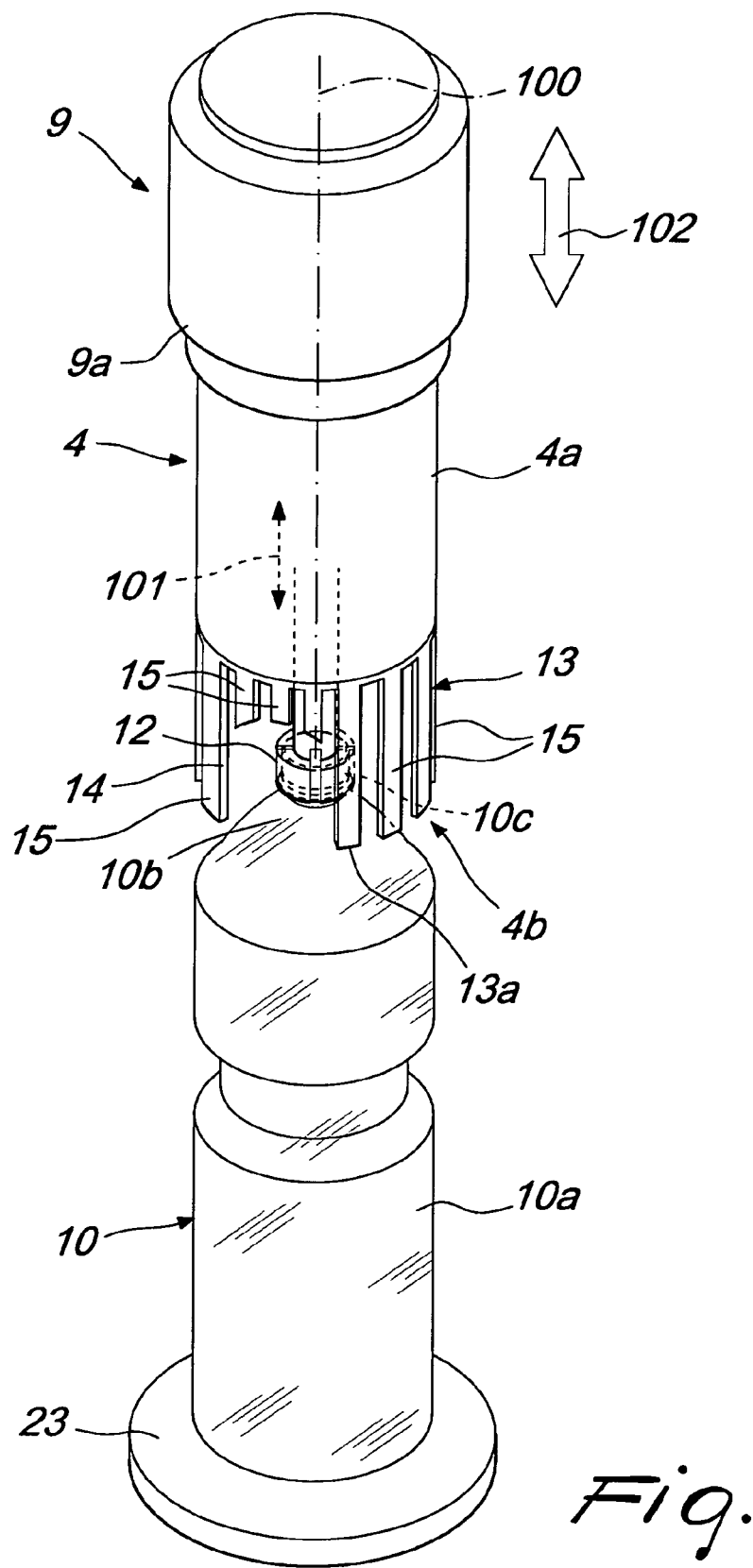
FIG. 5 is a view of a possible constructive variation of the device for forming and transferring a sleeve-like label.
Figure 6:
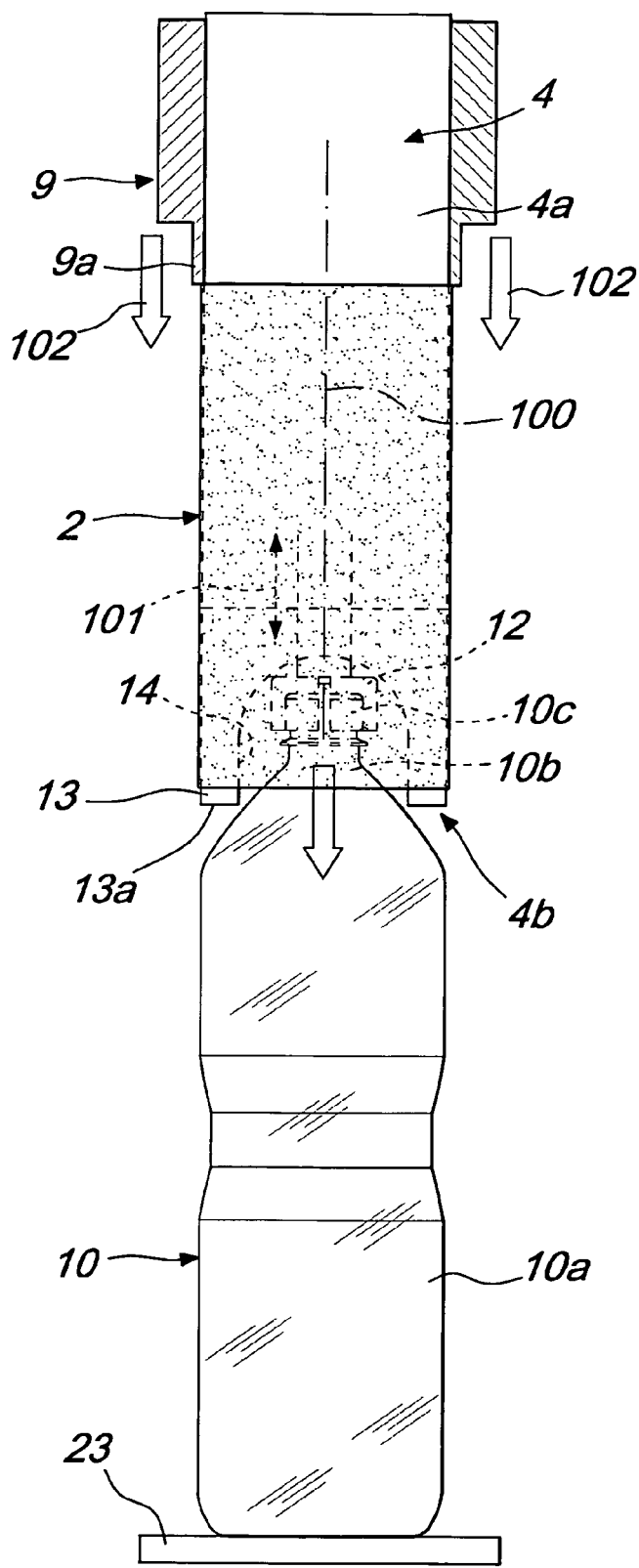
FIGS. 6 and 7 are lateral elevation and partially sectional views of the forming and transferring device, respectively with the sleeve-like label wrapped around the forming spindle and fitted around the container to be labeled.
Figure 7:
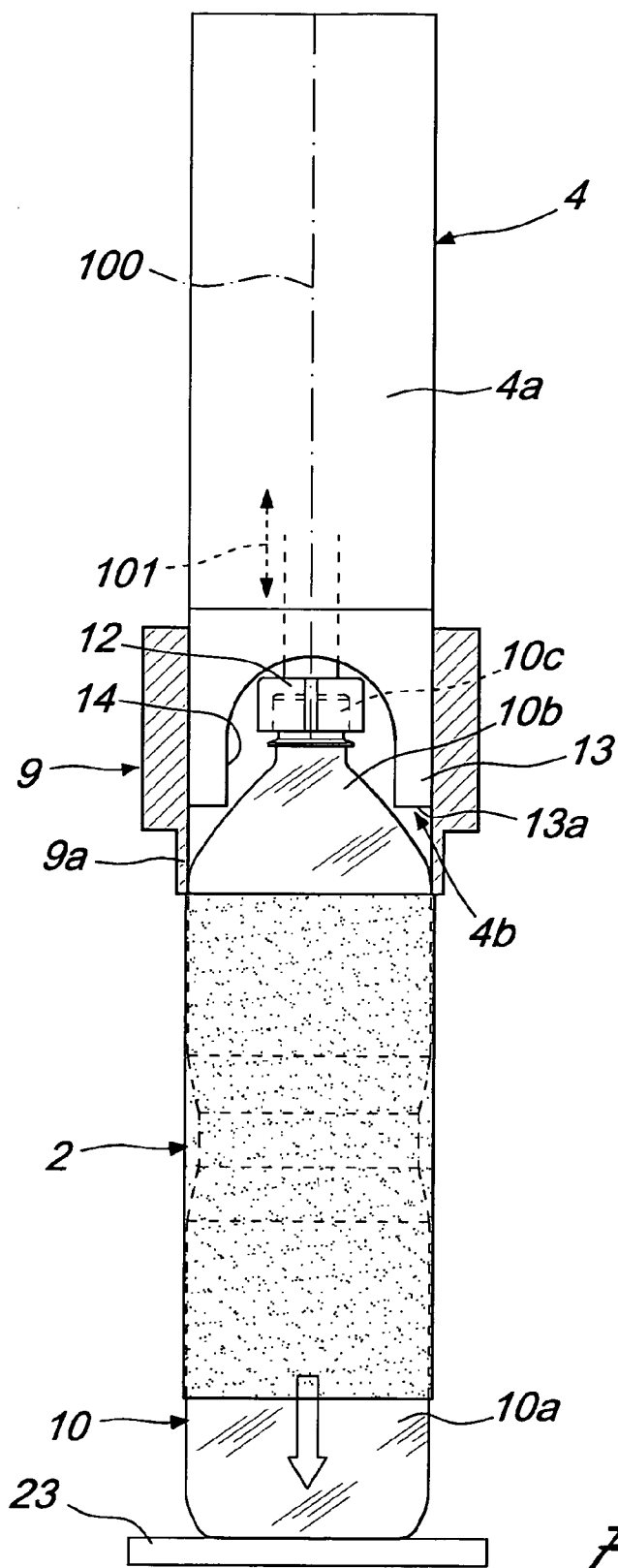

However, nothing forbids, as shown in FIG. 5, the terminal guiding body 13 from comprising a plurality of guiding elements 15, which extend downward from the peripheral edge of the corresponding forming spindle 4 along a direction that is substantially parallel to the rotation axis 100 of the forming spindle 4.

In this specific case, the guiding elements 15 may be made of spring-type metal capable of returning, even after possible impacts, to the initial condition in which they define the terminal guiding body 13.

As an alternative, it is possible to provide, substantially at their top portion, weaker portions adapted to facilitate the breaking or bending of the individual guiding elements 15 so as to prevent any impacts from damaging the device as a whole.

According to a particular embodiment (not shown in the figures), especially in the case of applications on containers to be labeled 10 that have an asymmetric shape with respect to their vertical axis, the lower edge 13a of the terminal guiding body 13 might not lie on a substantially horizontal plane, but might have an extension with a level variation with respect to the upper end 10c of the top portion 10b of the container to be labeled 10, so as to be able to extend, in certain regions, up to the minimum level allowed by the shape of the container 10.

In this case it might be useful to support the container to be labeled, in the labeling position, from below by a supporting pan 23 that can be actuated rotationally together with the respective forming spindle 4.

The transfer means 9 can comprise at least one pusher body 9a, which can move on command along a pushing direction 102 that is substantially parallel to the rotation axis 100 of the forming spindle 4.

Advantageously, the forming spindle 4 is associated with a respective locking head 12, which can move on command, along a direction 101 that is substantially parallel to the rotation axis 100 of the forming spindle 4, so as to pass between a raised disengagement condition, which is adapted to allow the container to be labeled 10 to move, along the approach path 21a, into the labeling position and to allow the unloading, along the spacing path 22a, from the labeling position, and a lowered engagement condition, in which the locking head 12 presses against the upper end 10c of the top portion 10b of the container to be labeled 10, which is arranged in the labeling position.

In particular, it is convenient to provide the wrapping means 7 so that they form an overlap region 8 between a first longitudinal end 5a of the band of heat-shrink film 5 designed to make contact with the lateral surface 4a of the forming spindle 4 and the second longitudinal end 5b of the band of heat-shrink film 5.

According to a preferred embodiment, the device 1 has means 11 for heat-sealing the first longitudinal end 5a to the second longitudinal end 5b of the band of heat-shrink film 5 wrapped around the corresponding forming spindle 4 to provide the joining portion 8a, which advantageously extends transversely to the direction of longitudinal extension of the band of heat-shrink film 5.

The heat-sealing device 11 may be provided in various ways. Merely by way of example, it is possible for this heat-sealing device 11 to be constituted by heat-sealing means selected from the group that comprises:
a laser heat-sealing device;
an infrared heat-sealing device;
a sealing bar heat-sealing device;
an ultrasonic heat-sealing device.

Advantageously, the device 1 has, between the feeder spool 3 and the wrapping means 7, cutting means 16, which are designed to cut a continuous film 17 made of heat-shrink polymeric material that is unwound from the feeder spool 3 in order to provide the cut portions 5.

More precisely, the device 1 is provided with means for supplying the portions of film 5 to the wrapping means 7 and consequently to the forming spindles 4.

According to a preferred embodiment, these supply means may be provided by means of an unwinder which is associated, for example, with a transfer drum 18.

Conveniently, the supply means also comprise the cutting means 16, which, as explained previously, are designed to cut the continuous film 17 unwound from the feeder spool 3 in order to provide the portions of heat-shrink film 5 that are subsequently used to form the sleeve-like label 2.

As shown in FIG. 1, the transfer drum 18 can turn about a corresponding movement axis 201 along a direction of rotation designated by the letter A.

According to a practical embodiment, the transfer drum 18 has, in a manner known per se, a lateral wall in which there are a plurality of holes connected to a pneumatic device adapted to draw air into the transfer drum 18 or expel air from the transfer drum 18, through such holes, as a function of the angular position of the latter, during the rotation of the transfer drum 18, with respect to the movement axis 201.

In practice, by drawing air through the holes it is possible to keep the portions of heat-shrink film 5, obtained in each instance with the cutting means 16, in snug contact with the lateral wall of the transfer drum 18 and, by means of expulsion of the air from the transfer drum 18, it is possible instead to detach the bands of heat-shrink film 5 from the lateral wall of the transfer drum 18 in order to allow them to move onto the corresponding wrapping means 7 (usually constituted by the forming spindles 4 themselves) arranged downstream of the transfer drum 18 and arranged, in the illustrated embodiment, at the peripheral region of a carousel 20, above the containers to be labeled 10.

The forming spindle or spindles 4, which constitute the wrapping means 7, are oriented with their corresponding rotation axes 100 substantially parallel to the movement axis 201 of the transfer drum 18 and can be engaged, on their lateral surface 4a, by the portion of heat-shrink film 5 made available in each instance by the transfer drum 18 when, by rotating about a carousel 20, they reach a position that faces the transfer drum 18.

The forming spindles 4, moreover, are actuated rotationally, about the corresponding axis 100, in order to perform the wrapping, on their lateral surface 4a, of the portions of heat-shrink film 5 taken from the transfer drum 18.

Once the wrapping of the portion of heat-shrink film 5 around the lateral surface 4a of the forming spindle 4 has been completed, the latter, by rotating along the carousel 20, arrive at the heat-sealing means 11 so as to provide, at the overlap region 8, the junction portion 8a.

In order to ensure optimum adhesion of the portions of heat-shrink film 5 to the lateral surface 4a of the forming spindles 4, there are means for drawing air through a plurality of openings formed in the lateral surface 4a of the forming spindles 4.

The means 9 for transferring the sleeve-like label 2 formed by the forming spindle 4 to a container to be labeled 10 may be, for example, constituted by a pusher ring 9a moved coaxially to the respective forming spindle 4 in order to push the sleeve-like label 2 wrapped around it toward the container to be labeled 10 which is placed on a supporting pan 23 arranged below the forming spindle 4.

In order to facilitate this operation, it may be suitable to interrupt the action of the suction means that operate on the forming spindle 4 and activate the means for expelling air from its openings which are arranged on its lateral surface 4a, so as to obtain a detachment of the sleeve-like label 2 from the lateral surface 4a of the forming spindle 4 on which it is fitted.

Moreover, on the lateral surface 4a of the forming spindle 4 there are advantageously a plurality of longitudinal guiding grooves for respective engagement elements provided on the pusher ring 9a, extending radially toward the rotation axis 100 and designed to push, during the transfer step, against the edge of the sleeve-like label 2 that is the upper one during use.

In practice it has been found that the invention can fully reach the intended aim and objects in all of its embodiments.

In particular, thanks to the presence of the terminal guiding body 13 arranged around the top portion 10b of the container to be labeled, the sleeve-like label 2 is "guided" by the forming spindle 4 over a path that extends downward beyond the upper end 10c of the top portion 10b of the container to be labeled 10, consequently increasing the effectiveness of the transfer operations and reducing the risk of jamming of the sleeve-like label 2.

Thanks to the lateral access opening 14, it is possible to use the terminal guiding body 13 on known labeling units without the need to vary the normal movement of the carousel with respect to the feeding and unloading belts.

All the characteristics of the invention, indicated above as advantageous, convenient or the like, may also be omitted or be replaced with equivalents.

In this regard, the terminal guiding body 13 can be provided with at least one lateral access opening 14 that has such an angular extension as to allow both the feeding and the unloading of the container to be labeled from the labeling position according to the kinematic mechanism of the movement of the forming spindle 4 about the carousel 20 or, as already mentioned, it is possible to provide a smaller lateral access opening 14 whose dimensions substantially correspond to the transverse space occupation of the top portion 10b of the container to be labeled 10, but in which the forming spindle 4 can be actuated rotationally about its own rotation axis 100.

Moreover, it has been found experimentally that the invention is extremely effective in the case of applications of both "partial" and "full" sleeve-like labels.

The individual characteristics illustrated with reference to general teachings or to particular embodiments may be all present in other embodiments or may replace characteristics in these embodiments.

The invention thus conceived is susceptible of numerous modifications and variations, all of which are within the scope of the appended claims.

In practice, all the materials used, as long as they are compatible with the specific use, as well as the shapes and dimensions may be any according to requirements.

Moreover, all the details may be substituted by other technically equivalent elements.

The disclosures in Italian Patent Application No. VR2010A000199 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A device for forming and transferring a sleeve-like label to a container to be labeled, comprising a supporting frame for a carousel designed to support said containers to be labeled, peripherally to said carousel a plurality of forming spindles being provided which are adapted to transfer a respective sleeve-like label onto the outer surface of a container to be labeled, a feeder designed to feed a portion of heat-shrink film to at least one forming spindle and means for wrapping said portion of heat-shrink film around the lateral surface of said forming spindle in order to provide a sleeve-like label designed to be transferred, by transfer means, from said at least one forming spindle to a container to be labeled, feeder means being provided which are adapted to move, along an approach path that has at least one component perpendicular to the axis of said forming spindle, said container to be labeled to a labeling position arranged below said at least one forming spindle and pick-up means adapted to pick up said container with said sleeve-like label fitted around the respective lateral surface along a spacing path for removal from said labeling position which has at least one component perpendicular to the axis of said forming spindle, wherein said at least one forming spindle comprises at least one terminal guiding body, which is arranged at a lower end of said forming spindle and has a lower edge arranged at least partially at a level lower than an upper end of a top portion of said container to be labeled in the labeling position, said at least one terminal guiding body having at least one lateral access opening that can be crossed by said top portion of said container to be labeled arriving at said labeling position along said approach path and leaving said labeling position along said spacing path, said device further comprising means for the angular movement of said forming spindle about its own axis to position said at least one late al access opening along said approach path so as to allow the feeding of said container to be labeled in said labeling position and along said spacing path in order to allow the discharge of said container with said sleeve-like label fitted around the respective lateral surface from said labeling position.

2. The device for forming and transferring a sleeve-like label to a container to be labeled according to claim 1, wherein said at least one terminal guiding body is provided monolithically with said forming spindle.

3. The device for forming and transferring a sleeve-like label to a container to be labeled according to claim 1, wherein said at least one terminal guiding body is associated detachably with said forming spindle.

4. The device for forming and transferring a sleeve-like label to a container to be labeled according to claim 1, wherein said at least one terminal guiding body comprises a side wall whose transverse dimension corresponds to that of said forming spindle.

5. The device for forming and transferring a sleeve-like label to a container to be labeled according to claim 1, wherein said terminal guiding body comprises a plurality of guiding elements that extend downward from the peripheral edge of said forming spindle along a direction that is substantially parallel to said rotation axis of said forming spindle.

6. The device for forming and transferring a sleeve-like label to a container to be labeled according to claim 1, wherein said forming spindle is associated with a respective locking head, which can move on command, along a direction that is substantially parallel to the rotation axis of said forming spindle, between a raised disengagement condition, so as to allow said container to be labeled to move, along said approach path, into said labeling position, and, along said spacing path, to be discharged from said labeling position, and a lowered engagement condition, in which said locking head presses against the upper end of the top portion of said container to be labeled, which is arranged in said labeling position.

7. The device for forming and transferring a sleeve-like label to a container to be labeled according to claim 1, wherein said wrapping means are designed to provide an overlap region between a first longitudinal end of said portion of heat-shrink film in contact with said forming spindle and a second longitudinal end of said portion of heat-shrink film, said overlap region being affected by the action of heat-sealing means which are adapted to form a joining portion in order to provide said sleeve-like label.

8. The device for forming and transferring a sleeve-like label to a container to be labeled according to claim 1, characterized in that the terminal guiding body has a single lateral access opening, which due to the action of the angular movement means is moved so as to intersect the approach path in order to allow the feeding of the container to be labeled in the labeling position and so as to intersect the spacing path to allow the unloading of the container with the sleeve-like label fitted around the respective lateral surface from the labeling position.

* * * * *